(12) United States Patent
Beardsley et al.

(10) Patent No.: US 7,111,004 B2
(45) Date of Patent: Sep. 19, 2006

(54) METHOD, SYSTEM, AND PROGRAM FOR MIRRORING DATA BETWEEN SITES

(75) Inventors: Brent Cameron Beardsley, Tucson, AZ (US); William Frank Micka, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 449 days.

(21) Appl. No.: 10/464,935

(22) Filed: Jun. 18, 2003

(65) Prior Publication Data
US 2004/0260970 A1   Dec. 23, 2004

(51) Int. Cl.
   *G06F 17/30* (2006.01)
(52) U.S. Cl. .............................. 707/8; 707/10
(58) Field of Classification Search ............. 707/8, 707/100, 10, 200, 201
   See application file for complete search history.

(56) References Cited

U.S. PATENT DOCUMENTS

| | | | |
|---|---|---|---|
| 5,682,513 A | 10/1997 | Candelaria et al. | 711/113 |
| 5,692,155 A | 11/1997 | Iskiyan et al. | 711/162 |
| 6,052,797 A * | 4/2000 | Ofek et al. | 714/6 |
| 6,088,697 A | 7/2000 | Crockett et al. | 707/10 |
| 6,105,078 A | 8/2000 | Crockett et al. | 710/18 |
| 6,145,066 A | 11/2000 | Atkin | 711/165 |
| 6,154,853 A * | 11/2000 | Kedem | 714/6 |
| 6,173,377 B1 | 1/2001 | Yanai et al. | 711/162 |
| 6,237,008 B1 | 5/2001 | Beal et al. | 707/204 |
| 6,397,307 B1 * | 5/2002 | Ohran | 711/161 |
| 6,484,187 B1 | 11/2002 | Kern et al. | 707/204 |
| 6,539,462 B1 | 3/2003 | Mikkelsen et al. | 711/162 |
| 6,950,915 B1 * | 9/2005 | Ohno et al. | 711/162 |
| 6,963,953 B1 * | 11/2005 | Nakajima | 711/129 |
| 7,003,635 B1 * | 2/2006 | Van Doren | 711/150 |
| 2003/0051111 A1 | 3/2003 | Nakano et al. | |

OTHER PUBLICATIONS

G. Castets, et al., "IBM TotalStorage Enterprise Storage Server PPRC Extended Distance", IBM Corp. International Technical Support Organization, Document No. SG24-6568-00, Jun. 2002.

* cited by examiner

*Primary Examiner*—Greta Robinson
*Assistant Examiner*—Cheryl Lewis
(74) *Attorney, Agent, or Firm*—David W. Victor; Konrad Raynes & Victor LLP

(57) ABSTRACT

Provided are a method, system, and program for mirroring data. A relationship is established between a plurality of source data units in a primary storage and a plurality of corresponding target data units in a secondary storage. An operation is initiated to perform an initial copy of all source data units in the relationship to the corresponding target data units. An update is received to a source data unit and a determination is made of whether a first write mode is indicated. The update is copied to the source data unit in the first write mode to the corresponding target data unit if the first copy write is indicated. Otherwise, the update is copied to the source data unit corresponding target data unit in a second write mode if the first write mode is not indicated. If the first write mode is not indicated, then a determination is made of whether a number of writes for all data units subject to the relationship falls below a threshold and the first write mode is indicated if the number of writes for all data units subject to the relationship falls below the threshold.

28 Claims, 6 Drawing Sheets

METHOD, SYSTEM, AND PROGRAM FOR MIRRORING DATA BETWEEN SITES

BACKGROUND OF THE INVENTION

1. Field of the Invention

The present invention relates to a system, method, and program for mirroring data between sites.

2. Description of the Related Art

Disaster recovery systems typically address two types of failures, a sudden catastrophic failure at a single point in time or data loss over a period of time. In the second type of gradual disaster, updates to volumes may be lost. To assist in recovery of data updates, a copy of data may be provided at a remote location. Such dual or shadow copies are typically made as the application system is writing new data to a primary storage device. International Business Machines Corporation (IBM), the assignee of the subject patent application, provides two systems for maintaining remote copies of data at a secondary site, extended remote copy (XRC) and peer-to-peer remote copy (PPRC). These systems provide a method for recovering data updates between a last, safe backup and a system failure. Such data shadowing systems can also provide an additional remote copy for non-recovery purposes, such as local access at a remote site. These IBM of XRC and PPRC systems are described in IBM publication "Remote Copy: Administrator's Guide and Reference," IBM document no. SC35-0169-02 (IBM Copyright 1994, 1996), which publication is incorporated herein by reference in its entirety.

In backup systems where data is mirrored, data is maintained in volume pairs. A volume pair is comprised of a volume in a primary storage device and a corresponding volume in a secondary storage device that includes an identical copy of the data maintained in the primary volume. Typically, the primary volume of the pair will be maintained in a primary direct access storage device (DASD) and the secondary volume of the pair is maintained in a secondary DASD shadowing the data on the primary DASD. A primary storage controller may be provided to control access to the primary DASD and a secondary storage controller may be provided to control access to the secondary DASD.

When a peer-to-peer relationship is established between source and target volumes, an initial copy operation is initiated to copy over all tracks in all source volumes to the target volumes in the peer-to peer relationship. The initial copy begins by setting bits in bitmaps representing the tracks in the source volumes to indicate to copy the source track to the corresponding target track. As part of a first pass of the volume bitmaps, the primary storage controller would asynchronously copy from the first track in the first volume in the relationship to the corresponding target track to the last track in the last volume. After copying each track in the volumes included in the relationship, the primary storage controller would set the corresponding bit for the copied track to "off" indicating that the track was copied. If an update to a track is received during this first pass through of the bitmap tables, then the bit corresponding to the track to update is set "on". During a second pass of the bit map tables, only source tracks whose corresponding bit is "on" are copied asynchronously to the corresponding target storage tracks. Further, during the second phase, any updates received to the local primary storage are synchronously copied over to the secondary site. Thus, after the first pass of the bitmap table, any updates to source tracks in the relationship are copied synchronously, where complete is not returned to the application until the write to the target track completes.

To optimize bandwidth usage during the initial copy operation, the initial copy for the establish may be divided into subsets so that the volumes are copied over in groups during the initial copy. For instance, if there are 100 volumes in the relationship, the initial copy may be implemented by performing the first and second passes of the bitmap table with respect to a group of volumes, e.g., five. Then the first and second passes of the bit map table would be performed with respect to the next consecutive group of volumes. After doing the first pass for a group of volumes, any writes to such volumes that have been subjected to the first pass are copied synchronously to the corresponding target tracks. However, because the synchronous writes and initial copy sets share the same physical connection, as more volumes complete their initial copy, the number of synchronous writes increases due to the increasing number of volumes that are subjected to the first pass. This increasing number of synchronous writes that are sharing the bandwidth with the ongoing initial copy operations may cause transmission delays, thereby increasing the delays in returning complete to the application initiating the updates to the source tracks. Synchronous writes are used to improve data integrity at the secondary site by ensuring that complete is not returned until the update is successfully mirrored on the target tracks.

SUMMARY OF THE PREFERRED EMBODIMENTS

Provided are a method, system, and program for mirroring data. A relationship is established between a plurality of source data units in a primary storage and a plurality of corresponding target data units in a secondary storage. An operation is initiated to perform an initial copy of all source data units in the relationship to the corresponding target data units. An update is received to a source data unit and a determination is made of whether a first write mode is indicated. The update is copied to the source data unit in the first write mode to the corresponding target data unit if the first copy write is indicated. Otherwise, the update is copied to the source data unit corresponding target data unit in a second write mode if the first write mode is not indicated. If the first write mode is not indicated, then a determination is made of whether a number of writes for all data units subject to the relationship falls below a threshold and the first write mode is indicated if the number of writes for all data units subject to the relationship falls below the threshold.

In certain implementations, the first write mode comprises a synchronous write mode and wherein the second write mode comprises an asynchronous write mode.

In further implementations, a data structure is provided indicating source data units to copy to corresponding target data units. Indication is made in the data structure to copy all source data units to the corresponding target data units as part of the operation to perform the initial copy in the second write mode.

Still further, the data structure may be processed to determine source data units indicated in the data structure for copy to the corresponding target data units and all determined source data units may be copied in the second write mode to the corresponding target data units, wherein the update to the target data unit copied in the second write mode is copied as part of the copying of all the determined source data units.

In yet further implementations, the source and target data units in the relationship are in volume pairs, wherein determining whether the number of writes for all data units subject to the relationship falls below a threshold comprises determining whether the number of writes for all volume pairs falls below the threshold, wherein the first write mode is indicated for all volume pairs in the relationship if the number of writes for all volume pairs subject to the relationship falls below the threshold.

Described implementations provide techniques for mirroring data between a primary and secondary storage using different write modes for different situations in order to optimize the performance of the mirror copy operations.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

Figure 1:
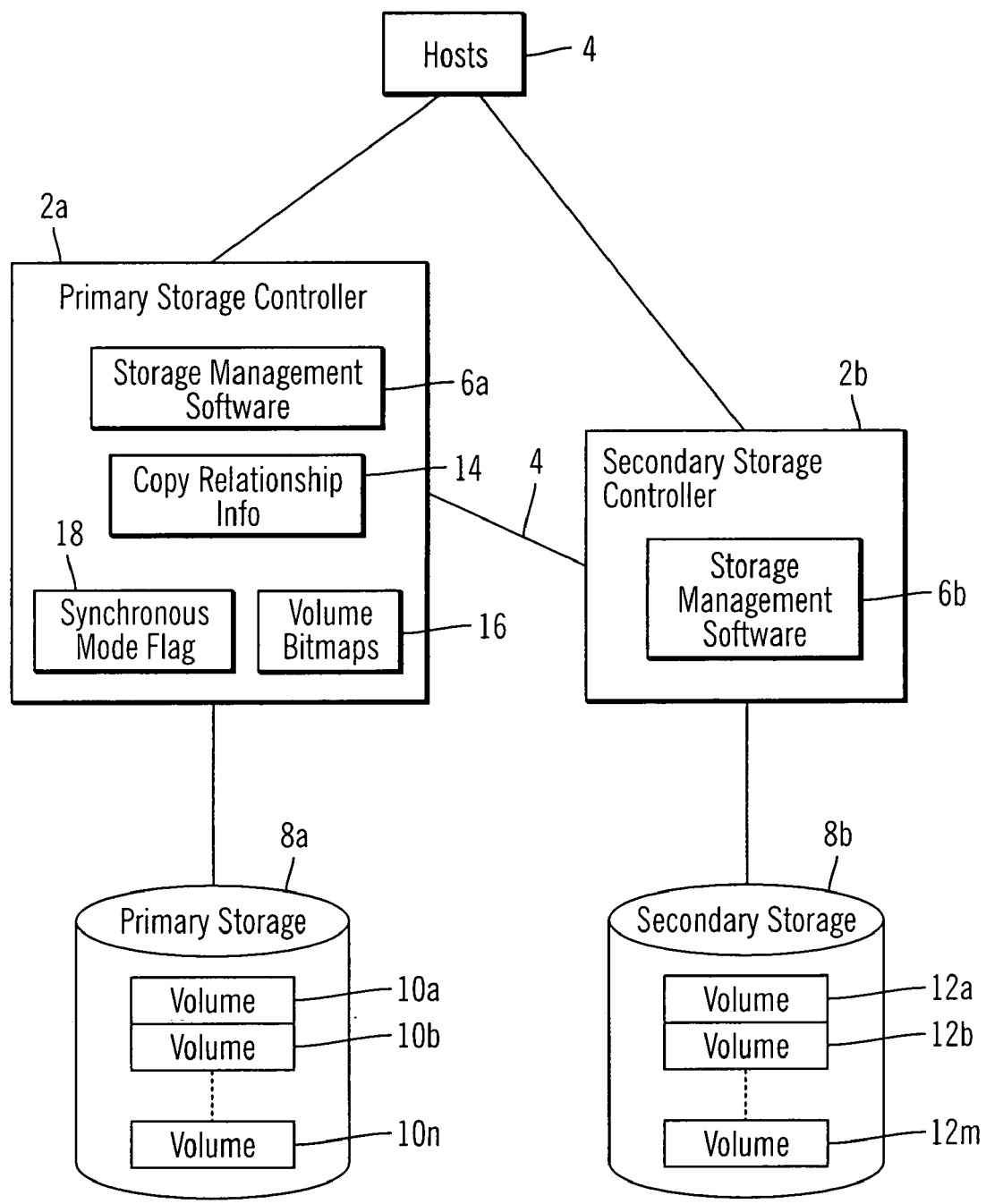
FIG. 1 is a block diagram illustrating a network computing environment in which aspects of the invention are implemented.

In the following description, reference is made to the accompanying drawings which form a part hereof and which illustrate several embodiments of the present invention. It is understood that other embodiments may be utilized and structural and operational changes may be made without departing from the scope of the present invention FIG. 1 illustrates a network computing environment in which aspects of the invention may be implemented. A primary storage controller 2a and secondary storage controller 2b communicate over a connection 4. The storage controllers 2a, 2b each have storage management software 6a, 6b and attached storage systems 8a, 8b. The storage systems 8a and 8b include volumes 10a, 10b. . . 10n and 12a, 12b. . . 12n, respectively. The storage controllers 2a, 2b may be situated with respect to each other in a relatively close geographical area, such as a same building, different buildings in a same campus, a same city, etc. or at distant geographical locations, such as different continents, thousands of miles apart, etc. The connection 4 between the storage controllers 2a, 2b may comprise a dedicated line or network, such as a fibre optical connection, Storage Area Network (SAN), Local Area Network (LAN), etc. Alternatively, the connection 4 may comprise an Intranet or the Internet. Host systems 10 include applications that may perform Input/Output (I/O) operations with respect to volumes in the storage systems 8a, 8b.

The storage controllers 2a and 2b would further include a processor complex (not shown) and may comprise any storage controller or server known in the art, such as the IBM Enterprise Storage Server (ESS)®, 3990® Storage Controller, etc. (Enterprise Storage Server is a registered trademark of IBM). The storage systems 8a, 8b may comprise an array of storage devices, such as Just a Bunch of Disks (JBOD), Redundant Array of Independent Disks (RAID) array, virtualization device, etc. The storage management software 6a, 6b may include code to allow for mirroring of data and data recovery in the event of a failure, such as the code included in the IBM PPRC Extended Distance (XD) program, to allow for mirroring of data over relatively short and long distances. Further details of the IBM PPRC extended distance program are described in the IBM publication "IBM TotalStorage Enterprise Storage Server PPRC Extended Distance", having document no. SG24-6568-00 (Copyright IBM, June 2002), which publication is incorporated herein by reference in its entirety.

The storage management software 6a maintains copy relationship 14 information identifying the volume pairs, i.e., source tracks and corresponding target tracks, that are included in a copy relationship, such that tracks in the source volumes are mirrored to tracks in the target volumes. Bitmaps 16 are maintained for each volume including one bit for each track in the volume. A bit in the bitmap for a volume set indicates whether an update (or initial data to copy) for a track has been copied to the corresponding target track. Further a synchronous mode flag 18 indicates whether writes to the source volumes should be handled asynchronously (where complete is returned to the application before the write is applied to the secondary storage 8b) or synchronously (where complete is returned only after confirmation is received that the write is applied to the secondary storage 8b).

Figure 2:
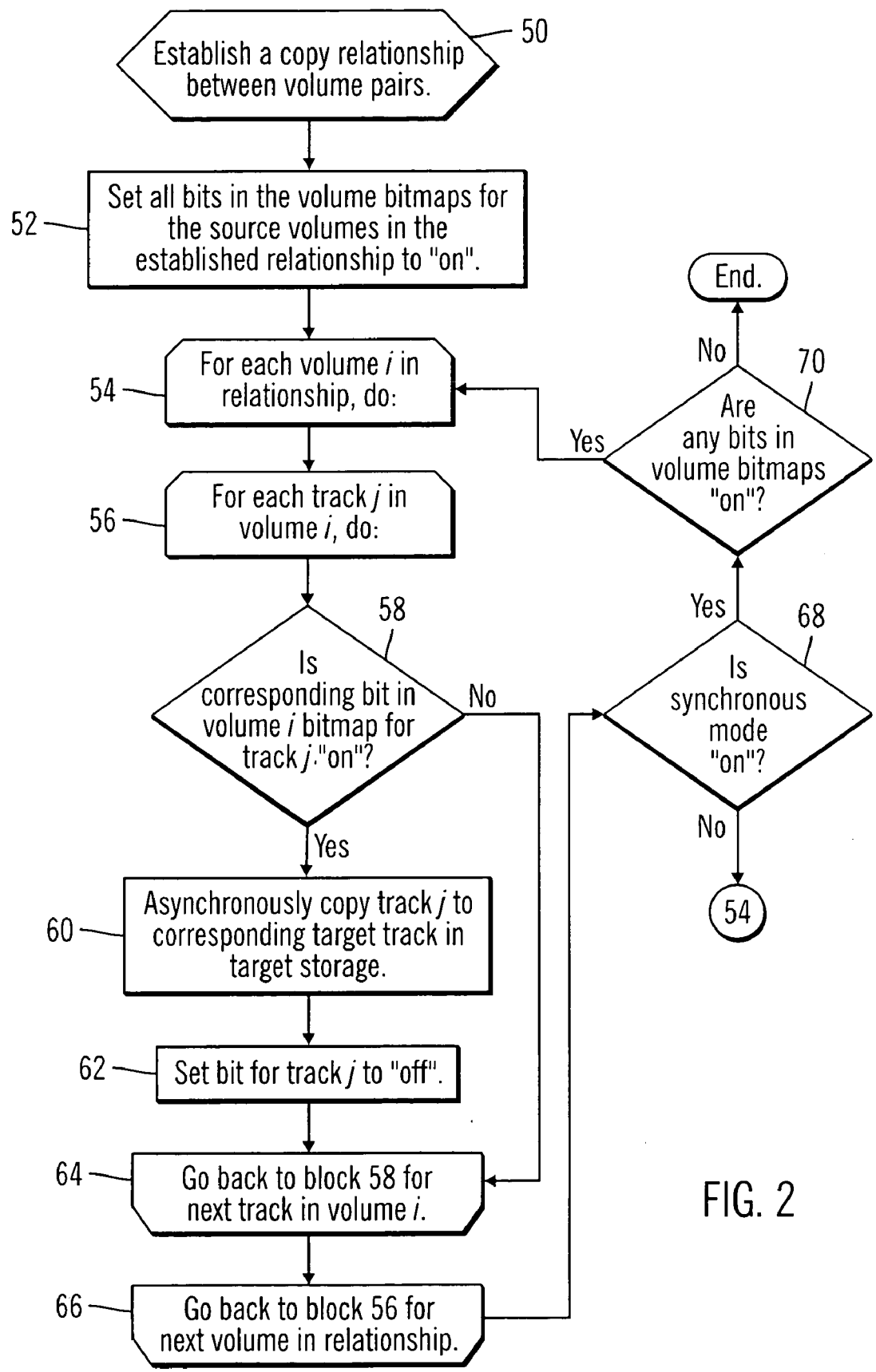
FIGS. 2, 3, and 4 illustrate operations performed to manage data mirroring operations between a primary and secondary storage site.

FIG. 2 illustrates operations performed by the source management software 6a to perform the initial copy of source tracks in the source volumes 10a, 10b. . . 10n to the corresponding tracks in the target volumes 12a, 12b. . . 12n in accordance with implementations of the invention. When establishing (at block 50) a copy relationship between source and target volumes, such as a peer-to-peer copy relationship, the storage management software 6a sets (at block 52) all bits in the volume bitmaps 16 for the source volumes in the established relationship to "on"—indicating such source tracks need to be copied (synchronized) to the target volume 12a, 12b. . . 12m in the secondary storage 8b. A loop is then performed (at blocks 54 through 66) for each source volume i in the established relationship. For each track j in the source volume i, an inner loop is performed at blocks 56 through 64. If (at block 58) the corresponding bit in the volume i bitmap 16 for track j is "on", then that track j is asynchronously copied (at block 60) to the corresponding target track in the secondary storage 8b. The bit for track j in the volume i bitmap 16 is set (at block 62) to "off", indicating that the source track represented by such bit has been copied over. If (at block 58) the corresponding bit in the volume i bitmap 16 for track j is "off", then control proceeds to block 64 to consider whether to copy the next track in volume i.

After processing all bits in the bitmaps 16 representing source tracks in the relationship, if (at block 68) the synchronous mode flag 18 is set to indicate that writes are handled synchronously, then the storage management software 6a determines whether (at block 70) there are still tracks to copy, as indicated by any one bit in the source volume bitmaps 16 set "on". If so, control proceeds back to block 54 to process all the volume bitmaps to copy over any source tracks whose corresponding bit value is "on". Otherwise, if there are no more tracks to copy asynchronously, then control ends and synchronization is complete. Further, if (at block 68) the synchronous mode flag 18 indicates that updates are copied asynchronously, then control proceed to block 54 to continue copying tracks asynchronously. Note that according to the logic of FIG. 3, the synchronous mode is set when the number of tracks indicated in the volume bitmaps 16 for the relationship to copy fall below a threshold number.

For the logic of FIG. 2, the steps at blocks 54 through 56 may be performed continuously until the synchronous mode is set and the source and target volumes in the relationship are synchronized, i.e., the bitmaps for all volumes in the relationship indicate no more tracks to copy over. This continual operation may be implemented in the PPRC XD asynchronous mode until the source and target volumes are fully synchronized.

Figure 3:
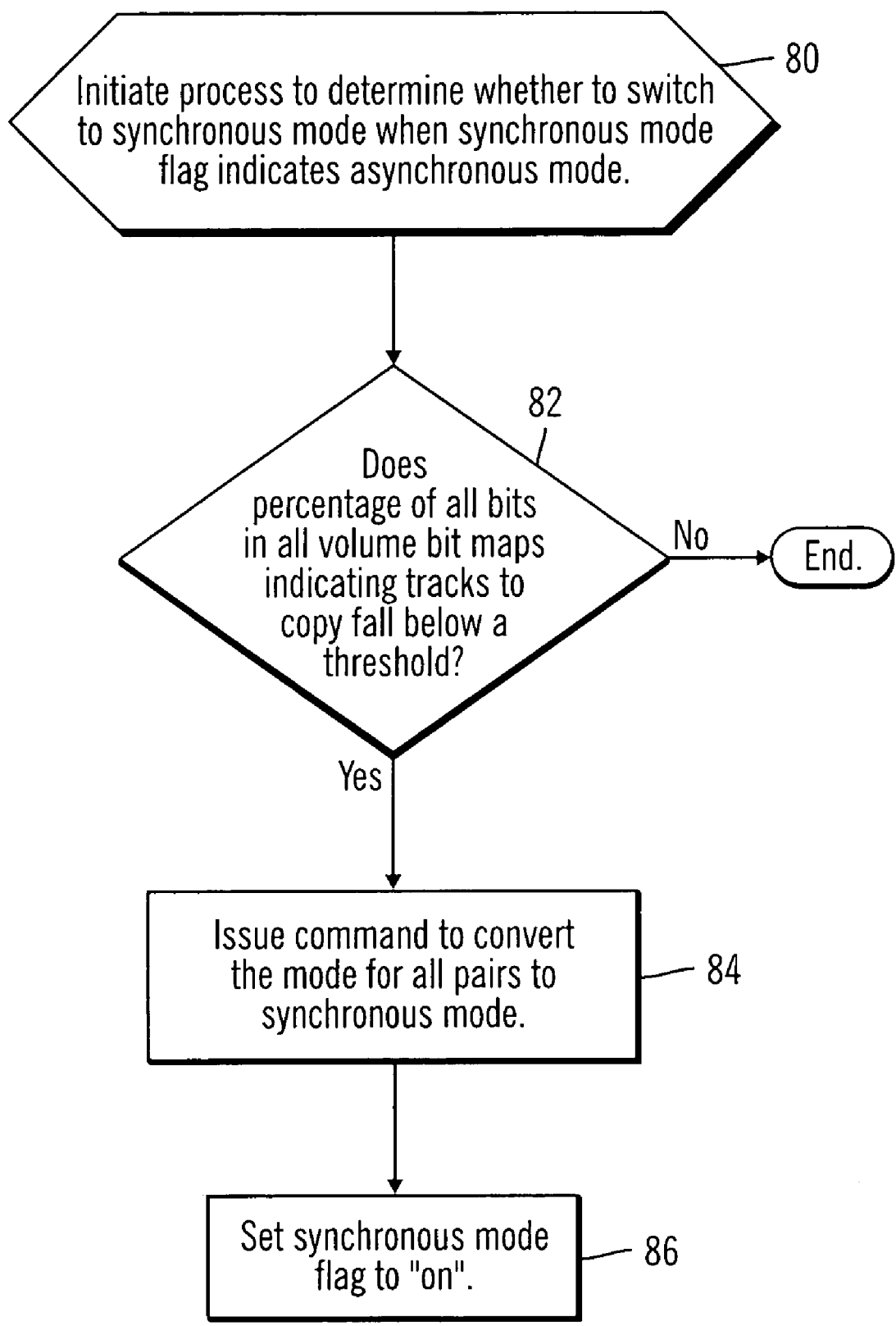

FIG. 3 illustrates operations the storage management software 6a performs to set the synchronous mode flag 18 to "on". If the current write mode is asynchronous, i.e., the synchronous mode flag 18 is "off", then the storage management software 6a would periodically initiate a process at block 80. If (at block 82) the percentage of all bits in all bitmaps 16 for source volumes in the relationship is less than a threshold percentage, then the storage manage software 6a issues (at block 84) one or more commands to convert the write mode for all volume pairs in the relationship just checked to synchronous mode. The synchronous mode flag 18 is set (at block 86) "on" to indicate that new writes to source tracks in the relationship are copied synchronously to the target tracks. If (at block 82) the lower threshold is not met, then control ends.

The described implementations operate to minimize delays in responding to host writes by handling the copying of data from the source to target asynchronously, so that there are no delays to a host 4 application write request. After a sufficient number of source tracks have been copied over to the secondary storage for all target and source volume pairs in a relationship, writes to source tracks are handled in the synchronous mode because the number of tracks to copy asynchronously as indicated in the volume bitmaps 16 is deemed to not be a sufficient number that would unduly delay the processing of synchronous writes. Thus, no volume will experience the synchronous delays until the number of writes across all volumes in the relationship are ready for synchronous mode processing. For instance, if there are numerous tracks to copy asynchronously, as indicated in the volume bitmaps 16, then synchronous writes could be significantly delayed due to the bandwidth and transmission delays resulting from the high number of asynchronous writes to perform. However, if the pending tracks to write asynchronously is of a sufficiently small number, then the asynchronous copying would not unduly delay synchronous writes. The threshold of when to switch to synchronous copying of writes may be set to a value such as a few percent of all tracks in all source volumes. In alternative implementations, the value to use as the threshold may be set to any empirically determined value that will optimize the initial copy and response to host write requests. The described implementations asynchronously copy updates to source tracks if the bandwidth is being substantially consumed by the initial copy operations until the time that the data to copy asynchronously has dropped to a level that will not cause undue delays to synchronous writes.

Figure 4:
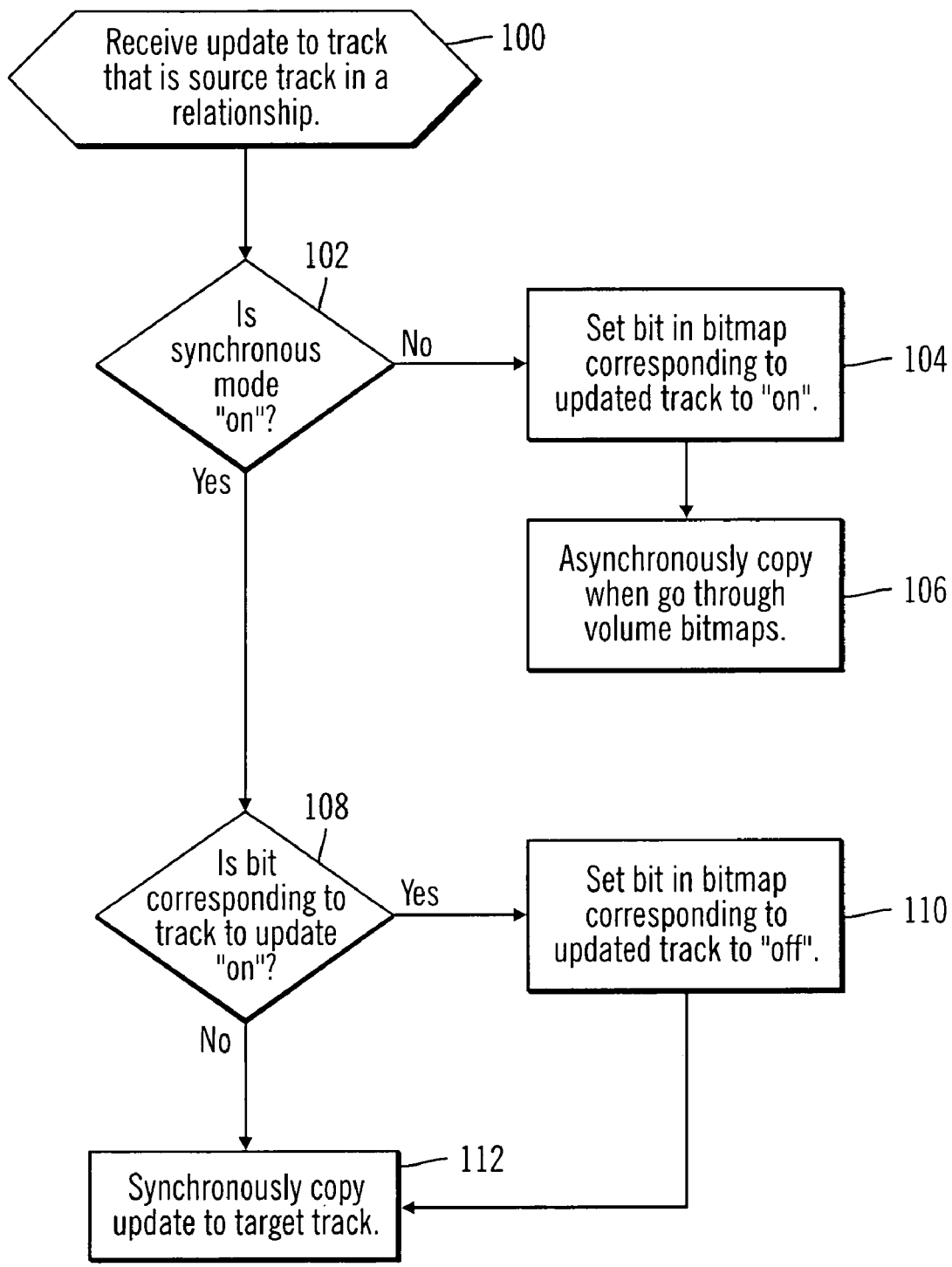

FIG. 4 illustrates operations performed by the storage management software 6a to handle an update to a source track in accordance with implementations of the invention. Upon receiving (at block 100) an update to a track that is a source track in a copy relationship, if (at block 102) the synchronous mode flag 18 is set to "off", indicating updates are to be copied asynchronously, then the storage management software 6a sets (at block 104) the bit in the volume bitmap 16 corresponding to the updated track to "on". The updated source track would subsequently be copied (at block 106) over to the corresponding target track when the storage management software 6a processes the volume bitmaps 16 to asynchronously copy tracks as part of the operations described in FIG. 2. If (at block 102) the synchronous mode flag 18 is "on" and if (at block 108) the bit corresponding to the source track to update is "on", then the corresponding bit is set (at block 110) to "off" and the track is synchronously copied (at block 112) to the target track in the secondary storage 8b. Alternatively, from the yes branch of block 108, control could end and the update would be asynchronously copied during the execution of the logic of FIG. 2. If (at block 108) the bit corresponding to the source track to update is "off", then the updated track is synchronously copied (at block 112).

Figure 5:
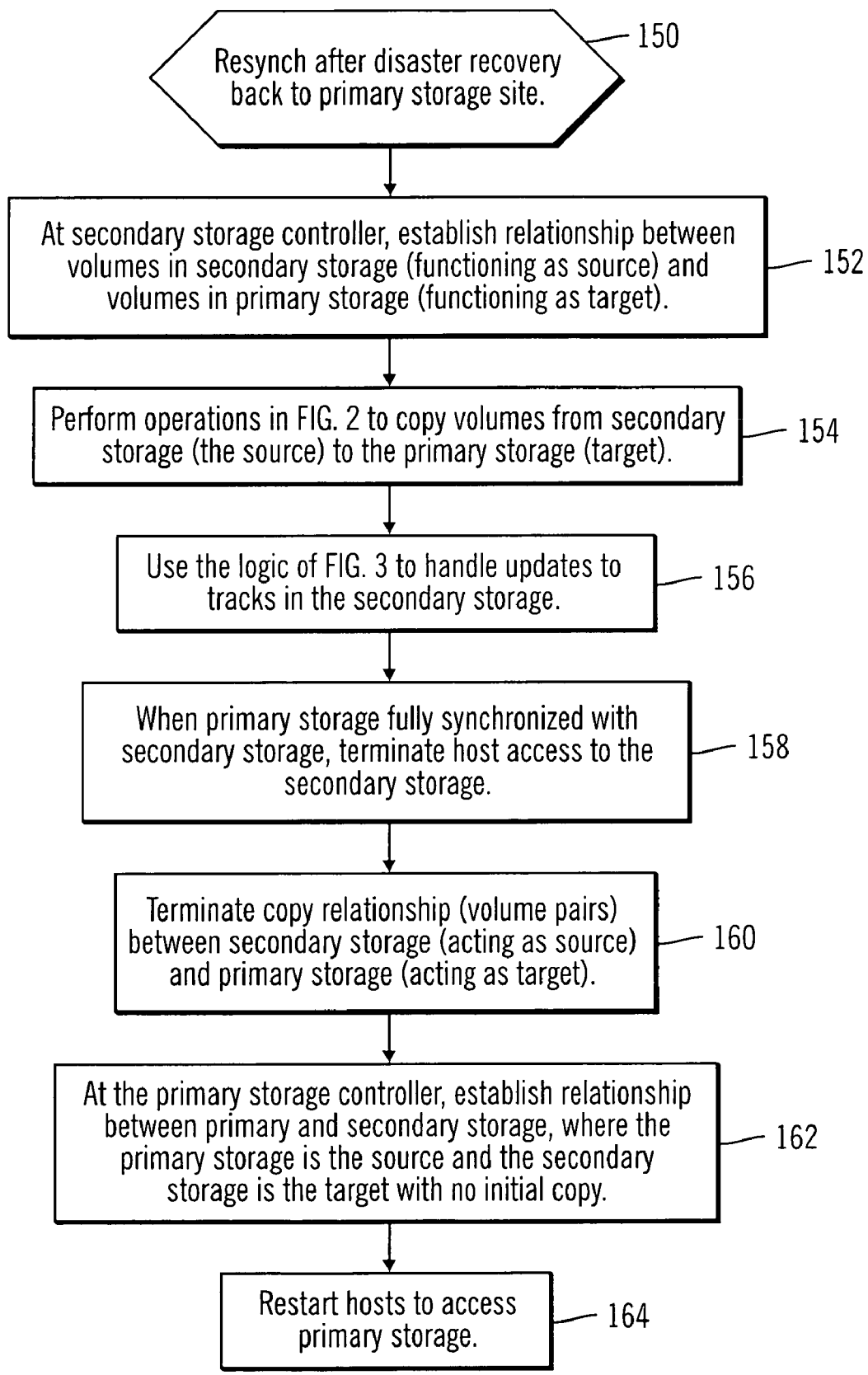
FIG. 5 illustrates operations performed to resynchronize a primary storage site after disaster recover.

In the event of a failure at the primary storage 8a site, the copy relationship would be suspended and operations would be restarted at the secondary site, including the secondary storage controller 2b and storage 8b. FIG. 5 illustrates operations the storage management software 6a performs to resynchronize back to the primary storage 8a after the primary site becomes available in accordance with implementations of the invention. To resynchronize back to the primary storage 8a (at block 150), at the secondary storage controller 2b, a copy relationship, such as a peer-to-peer copy relationship (e.g., PPRC), is established between volumes 12a, 12b. . . 12n in the secondary storage 8b (functioning as the source) and volumes 10a, 110b. . . 10n in the primary storage 8a (functioning as the target). The secondary storage management software 6b would then perform (at block 154) the operations described with respect to FIG. 2 to copy the source volumes 12a, 12b. . . 12n from the secondary storage 8b (the source) to the primary storage 8a (target). The secondary storage controller 2b would further perform (at block 156) the operations of FIG. 4 to handle any updates to the secondary storage 8b from the hosts 4 during the resycnhronization.

When the primary storage 8a is fully synchronized with the secondary storage 8b, i.e., the volume bitmaps indicate no source tracks to copy to the target tracks, the secondary storage controller 2b would terminate (at block 158) host access to the secondary storage 8b and terminate (at block 160) the copy relationship (volume pairs) between the secondary storage 8b (acting as source) and primary storage 8b (acting as target). At the primary storage controller 2a, the primary storage management software 6a would establish (at block 162) a relationship between the primary 8a and secondary 8b storage with no initial copy, where the primary storage 8a is the source and the secondary storage 8b is the target. The hosts 4 would then be restarted (at block 164) and initialized to direct I/O to the primary storage 8a.

Described implementations provide a technique for handling the initial copy of source tracks in a relationship to corresponding target tracks and updates to source tracks that occur during the initial copy to both minimize delays in returning complete to track updates and ensure synchronization at the secondary copy. Further, described implementations provide for synchronous copying of updates at some point to ensure the concurrency of the data at the secondary storage in the event of the need to failover to the secondary storage.

ADDITIONAL IMPLEMENTATION DETAILS

The described techniques for mirroring data between a primary and secondary site may be implemented as a method, apparatus or article of manufacture using standard programming and/or engineering techniques to produce software, firmware, hardware, or any combination thereof.

The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor complex. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

The described implementations were described with respect to the IBM PPRC Extended Distance computing environment. However, the described implementations for maintaining consistency could be applied to maintain consistency in other computing and vendor environments and using other data copying protocols and programs than described herein.

In certain implementations, data in the storage devices is arranged in tracks and volumes. In alternative systems, the data units of storage may comprise units other than tracks, such as blocks, sub-blocks, etc. and the data units may be grouped in storage units other than volumes.

In described implementations, the synchronous mode for copying updates to source track was initiated if the number of source tracks to copy over fell below a certain threshold, such as a few percent of all source tracks included in the copy relationship. In alternative implementations, alternative thresholds may be used.

In described implementations, a bitmap is used to indicate whether a source track needs to be copied to the corresponding target track. In alternative implementations, any data structure known in the art may be used to identify source tracks to copy to corresponding target tracks in the relationship.

In described implementations, the application of synchronous mode was made for all volumes involved in the relationship. In alternative implementations, synchronous mode may be applied on a volume-by-volume basis or some other grouping less than all source volumes so that updates to tracks in certain source volumes may be handled synchronously and updates to tracks in other source volumes may be handled asynchronously. In such implementations, the threshold may be applied on a volume-by-volume basis to determine when the synchronous mode would apply to that volume.

The illustrated logic of FIGS. 2–5 show certain events occurring in a certain order. In alternative implementations, certain operations may be performed in a different order, modified or removed. Morever, steps may be added to the above described logic and still conform to the described implementations. Further, operations described herein may occur sequentially or certain operations may be processed in parallel. Yet further, operations may be performed by a single processing unit or by distributed processing units.

Figure 6:
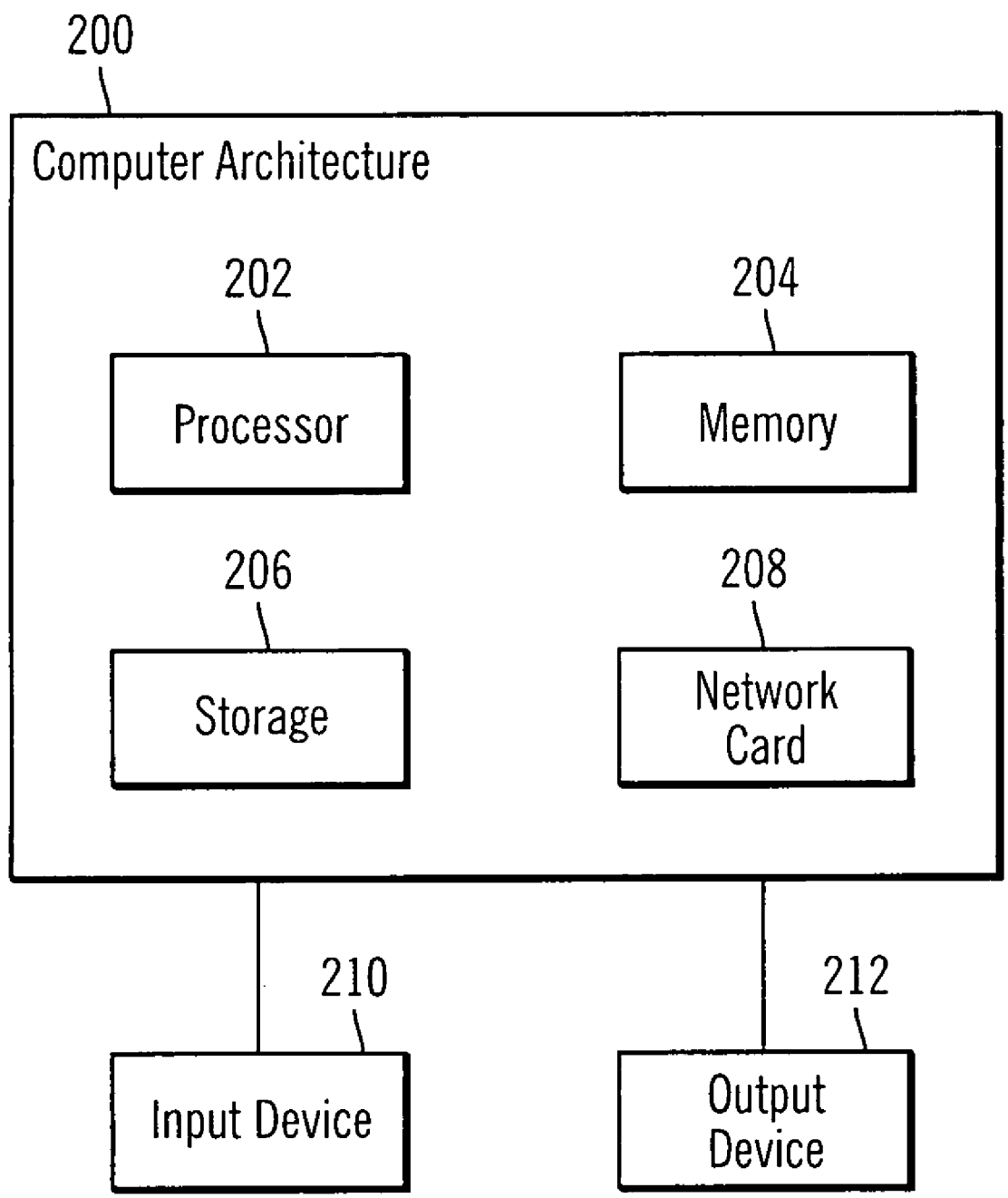
FIG. 6 illustrates an architecture of computing components in the network environment, such as the storage controllers and monitoring system.

FIG. 6 illustrates one implementation of a computer architecture 200 of the network components, such as the storage controllers and hosts shown in FIG. 1. The architecture 200 may include a processor 202 (e.g., a microprocessor), a memory 204 (e.g., a volatile memory device), and storage 206 (e.g., a non-volatile storage, such as magnetic disk drives, optical disk drives, a tape drive, etc.). The storage 206 may comprise an internal storage device or an attached or network accessible storage. Programs in the storage 206 are loaded into the memory 204 and executed by the processor 202 in a manner known in the art. The architecture further includes a network card 208 to enable communication with a network. An input device 210 is used to provide user input to the processor 202, and may include a keyboard, mouse, pen-stylus, microphone, touch sensitive display screen, or any other activation or input mechanism known in the art. An output device 212 is capable of rendering information transmitted from the processor 202, or other component, such as a display monitor, printer, storage, etc.

The foregoing description of various implementations of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer implemented method for mirroring data, comprising:
    establishing a relationship between a plurality of source data units in a primary storage and a plurality of corresponding target data units in a secondary storage;
    initiating an operation to perform an initial copy of all source data units in the relationship to corresponding target data units;
    receiving an update to a source data unit;
    determining whether a first write mode is indicated;
    copying the update to the source data unit in the first write mode to the corresponding target data unit if the first copy write is indicated;
    copying the update to the source data unit to the corresponding target data unit in a second write mode if the first write mode is not indicated;
    if the first write mode is not indicated, then determining whether a number of writes for all data units subject to the relationship falls below a threshold; and
    indicating the first write mode if the number of writes for all data units subject to the relationship falls below the threshold.

2. The method of claim 1, wherein the first write mode comprises a synchronous write mode and wherein the second write mode comprises an asynchronous write mode.

3. The method of claim 1, wherein the source data units copied to the corresponding target data units as part of the initial copy are copied in the first write mode.

4. The method of claim 1, further comprising:
providing a data structure indicating source data units to copy to corresponding target data units; and
indicating in the data structure to copy all source data units to the corresponding target data units as part of the operation to perform the initial copy in the second write mode.

5. The method of claim 4, further comprising:
processing the data structure to determine source data units indicated in the data structure for copy to the corresponding target data units;
copying all determined source data units in the second write mode to the corresponding target data units, wherein the update to the target data unit copied in the second write mode is copied as part of the copying of all the determined source data units.

6. The method of claim 5, further comprising:
in response to receiving the update, indicating in the data structure to copy the updated source data unit to the target data unit if the first write mode is not indicated.

7. The method of claim 5, wherein the steps of processing the data structure and copying all determined source data units are performed until the data structure does not indicate any source data units to copy to the corresponding target data units.

8. The method of claim 7, wherein the initial copy comprises a first time the steps of processing the data structure and copying all determined source data units are performed.

9. The method of claim 1, wherein the source and target data units in the relationship are in volume pairs, wherein determining whether the number of writes for all data units subject to the relationship falls below a threshold comprises determining whether the number of writes for all volume pairs falls below the threshold, wherein the first write mode is indicated for all volume pairs in the relationship if the number of writes for all volume pairs subject to the relationship falls below the threshold.

10. The method of claim 9, wherein determining whether the number of source data units to be copied is less than the threshold number comprises determining whether a percentage of source data units that are indicated to be copied of all the source data units in the relationship is less than threshold number.

11. A system for mirroring data, comprising:
a primary storage;
a secondary storage;
means for establishing a relationship between a plurality of source data units in the primary storage and a plurality of corresponding target data units in the secondary storage;
means for initiating an operation to perform an initial copy of all source data units in the relationship to the corresponding target data units;
means for receiving an update to a source data unit;
means for determining whether a first write mode is indicated;
means for copying the update to the source data unit in the first write mode to the corresponding target data unit if the first copy write is indicated;
means for copying the update to the source data unit to the corresponding target data unit in a second write mode if the first write mode is not indicated;
means for determining whether a number of writes for all data units subject to the relationship falls below a threshold if the first write mode is not indicated; and
means for indicating the first write mode if the number of writes for all data units subject to the relationship falls below the threshold.

12. The system of claim 11, wherein the first write mode comprises a synchronous write mode and wherein the second write mode comprises an asynchronous write mode.

13. The system of claim 11, further comprising:
a memory including a data structure;
means for indicating in the data structure source data units to copy to corresponding target data units; and
means for indicating in the data structure to copy all source data units to the corresponding target data units as part of the operation to perform the initial copy in the second write mode.

14. The system of claim 13, further comprising:
means for processing the data structure to determine source data units indicated in the data structure for copy to the corresponding target data units;
means for copying all determined source data units in the second write mode to the corresponding target data units, wherein the update to the target data unit copied in the second write mode is copied as part of the copying of all the determined source data units.

15. The system of claim 14, further comprising:
means for indicating in the data structure to copy the updated source data unit to the target data unit if the first write mode is not indicated in response to receiving the update.

16. The system of claim 15, wherein the steps of processing the data structure and copying all determined source data units are performed until the data structure does not indicate any source data units to copy to the corresponding target data units.

17. The system of claim 14, wherein the source and target data units in the relationship are in volume pairs, wherein the means for determining whether the number of writes for all data units subject to the relationship falls below a threshold determines whether the number of writes for all volume pairs falls below the threshold, wherein the first write mode is indicated for all volume pairs in the relationship if the number of writes for all volume pairs subject to the relationship falls below the threshold.

18. The system of claim 17, wherein the means for determining whether the number of source data units to be copied is less than the threshold number determines whether a percentage of source data units that are indicated to be copied of all the source data units in the relationship is less than threshold number.

19. A storage device implementing code for mirroring data between a primary storage and a secondary storage, wherein the code causes computer implemented operations to be performed, the operations comprising:
establishing a relationship between a plurality of source data units in the primary storage and a plurality of corresponding target data units in the secondary storage;
initiating an operation to perform an initial copy of all source data units in the relationship to the corresponding target data units;
receiving an update to a source data unit;
determining whether a first write mode is indicated;
copying the update to the source data unit to the in first write mode to the corresponding target data unit if the first copy write is indicated;
copying the update to the source data unit to the corresponding target data unit in a second write mode if the first write mode is not indicated;

if the first write mode is not indicated, then determining whether a number of writes for all data units subject to the relationship falls below a threshold; and indicating the first write mode if the number of writes for all data units subject to the relationship falls below the threshold.

20. The device of claim 19, wherein the first write mode comprises a synchronous write mode and wherein the second write mode comprises an asynchronous write mode.

21. The device of claim 19, wherein the source data units copied to the corresponding target data units as part of the initial copy are copied in the first write mode.

22. The device of claim 19, wherein the operations further comprise:

providing a data structure indicating source data units to copy to corresponding target data units; and indicating in the data structure to copy all source data units to the corresponding target data units as part of the operation to perform the initial copy in the second write mode.

23. The device of claim 22, wherein the operations further comprise:

processing the data structure to determine source data units indicated in the data structure for copy to the corresponding target data units;

copying all determined source data units in the second write mode to the corresponding target data units, wherein the update to the target data unit copied in the second write mode is copied as part of the copying of all the determined source data units.

24. The device of claim 23, wherein the operations further comprise:

in response to receiving the update, indicating in the data structure to copy the updated source data unit to the target data unit if the first write mode is not indicated.

25. The device of claim 23, wherein the steps of processing the data structure and copying all determined source data units are performed until the data structure does not indicate any source data units to copy to the corresponding target data units.

26. The device of claim 25, wherein the initial copy comprises a first time the steps of processing the data structure and copying all determined source data units are performed.

27. The device of claim 19, wherein the source and target data units in the relationship are in volume pairs, wherein determining whether the number of writes for all data units subject to the relationship falls below a threshold comprises determining whether the number of writes for all volume pairs falls below the threshold, wherein the first write mode is indicated for all volume pairs in the relationship if the number of writes for all volume pairs subject to the relationship falls below the threshold.

28. The device of claim 27, wherein determining whether the number of source data units to be copied is less than the threshold number comprises determining whether a percentage of source data units that are indicated to be copied of all the source data units in the relationship is less than threshold number.

* * * * *